(12) United States Patent
DiGirolamo et al.

(10) Patent No.: US 8,649,263 B2
(45) Date of Patent: *Feb. 11, 2014

(54) METHOD AND APPARATUS FOR SENDING AND RECEIVING CHANNEL QUALITY INDICATORS (CQIS)

(75) Inventors: Rocco DiGirolamo, Laval (CA); Christopher R. Cave, Montreal (CA); Paul Marinier, Brossard (CA); Sudheer A. Grandhi, Pleasanton, CA (US); Vincent Roy, Longueuil (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,301

(22) Filed: Apr. 20, 2012

(65) Prior Publication Data

US 2012/0201166 A1 Aug. 9, 2012

Related U.S. Application Data

(63) Continuation of application No. 13/037,161, filed on Feb. 28, 2011, which is a continuation of application No. 11/877,553, filed on Oct. 23, 2007, now Pat. No. 7,898,948.

(60) Provisional application No. 60/908,484, filed on Mar. 28, 2007, provisional application No. 60/888,146, filed on Feb. 5, 2007, provisional application No. 60/862,522, filed on Oct. 23, 2006.

(51) Int. Cl.
*H04L 12/26* (2006.01)
*H04W 4/00* (2009.01)
*H04J 3/22* (2006.01)

(52) U.S. Cl.
USPC ............ 370/229; 370/332; 370/338; 370/465

(58) Field of Classification Search
USPC ................. 370/229–240, 310–350, 431–491, 370/503–529; 375/141–150, 219–221, 260, 375/267, 295; 455/450, 509
See application file for complete search history.

(56) References Cited

U.S. PATENT DOCUMENTS 6,292,471 B1 9/2001 Cao et al.
6,925,561 B1 8/2005 Hunt et al.
(Continued)

FOREIGN PATENT DOCUMENTS

EP 1641302 3/2006
EP 1662689 5/2006
(Continued)

OTHER PUBLICATIONS

3rd Generation Partnership Project; Technical Specification Group Radio Access Network; High Speed Downlink Packet Access (HSPDA); Overall description; Stage 2 (Release 6); 3GPP TS 25.308 V6.3.0 (Dec. 2004).

(Continued)

*Primary Examiner* — Tri H Phan
(74) *Attorney, Agent, or Firm* — Volpe and Koenig, P.C.

(57) ABSTRACT

A method and apparatus for sending and receiving channel quality indicators (CQIs) is disclosed. A CQI may be sent or received periodically. A CQI may also be sent or received upon request by a network.

32 Claims, 4 Drawing Sheets

(56) References Cited

U.S. PATENT DOCUMENTS

| | | | |
|---|---|---|---|
| 7,319,718 B2 | 1/2008 | Roh et al. | |
| 7,412,252 B2 | 8/2008 | Anderson | |
| 7,701,844 B2 | 4/2010 | Terry | |
| 8,059,606 B2* | 11/2011 | Lee et al. | 370/333 |
| 8,098,745 B2* | 1/2012 | Bertrand et al. | 375/260 |
| 8,131,294 B2 | 3/2012 | DiGirolamo et al. | |
| 8,271,013 B2* | 9/2012 | Sagfors et al. | 455/522 |
| 8,483,162 B2* | 7/2013 | Seo et al. | 370/329 |
| 8,514,752 B2* | 8/2013 | Imamura et al. | 370/278 |
| 8,515,478 B2* | 8/2013 | Flore et al. | 455/515 |
| 2004/0152458 A1 | 8/2004 | Hottinen | |
| 2005/0009527 A1 | 1/2005 | Sharma | |
| 2006/0058051 A1 | 3/2006 | Takano et al. | |
| 2006/0120470 A1 | 6/2006 | Hwang et al. | |
| 2006/0135193 A1 | 6/2006 | Ratasuk et al. | |
| 2007/0171849 A1 | 7/2007 | Zhang et al. | |
| 2007/0230394 A1 | 10/2007 | Wang et al. | |
| 2008/0008212 A1 | 1/2008 | Wang et al. | |
| 2008/0080431 A1 | 4/2008 | Zeira et al. | |
| 2008/0084844 A1 | 4/2008 | Reznik et al. | |
| 2008/0159184 A1 | 7/2008 | Niwano | |
| 2008/0214193 A1* | 9/2008 | Jeong et al. | 455/436 |
| 2008/0273610 A1 | 11/2008 | Malladi et al. | |
| 2009/0219906 A1 | 9/2009 | Motegi et al. | |
| 2010/0020712 A1 | 1/2010 | Lee et al. | |
| 2010/0240410 A1 | 9/2010 | Peisa et al. | |

FOREIGN PATENT DOCUMENTS

| | | |
|---|---|---|
| EP | 1679924 | 7/2006 |
| WO | 2005/072073 | 8/2005 |
| WO | 2006/019710 | 2/2006 |
| WO | 2006/073271 | 7/2006 |
| WO | 2006/086878 | 8/2006 |
| WO | 2008/021188 | 2/2008 |

OTHER PUBLICATIONS $3^{rd}$ Generation Partnership Project; Technical Specification Group Radio Access Network; High Speed Downlink Packet (HSPDA); Overall description; Stage 2 (Release 6); 3GPP TS 25.308 V6.4.0 (Mar. 2007).
$3^{rd}$ Generation Partnership Project; Technical Specification Group Radio Access Network; Radio Resource Control (RRC); Protocol Specification (Release 7); 3GPP TS 25.331 V7.2.0 (Sep. 2006).
$3^{rd}$ Generation Partnership Project; Technical Specification Group Radio Access Network; Radio Resource Control (RRC); Protocol Specification (Release 8); 3GPP TS 25.331 V8.0.0 (Sep. 2007).
$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.2.0 (Sep. 2007).
$3^{rd}$ Generation Partnership Project; Technical Specification Group Radio Access Network; Evolved Universal Terrestrial Radio Access (E-UTRA); Multiplexing and channel coding (Release 8),3GPP TS 36.212 V8.0.0 (Sep. 2007).
3rd Generation Partnership Project; Technical Specification Group Radio Access Network; Multiplexing and channel coding (Release 8), 3GPP TS 36.212 V0.1.0 (Oct. 2006).
$3^{rd}$ Generation Partnership Project; Technical Specification Group Radio Access Network; Evolved Universal Terrestrial Radio Access (E-UTRA); Physical layer procedures (Release 8), 3GPP TS 36.213 V8.0.0 (Sep. 2007).
3rd Generation Partnership Project; Technical Specification Group Radio Access Network; Physical layer procedures (Release 8), 3GPP TS 36.213 V0.1.0 (Oct. 2006).
$3^{rd}$ Generation Partnership Project; Technical Specification Group Radio Access Network; Multiplexing and channel coding (FDD) (Release 6), 3GPP TS 25.212 V6.10.0 (Dec. 2006).
$3^{rd}$ Generation Partnership Project; Technical Specification Group Radio Access Network; Multiplexing and channel coding (FDD) (Release 5), 3GPP TS 25.212 V5.10.0 (Jun. 2005).
$3^{rd}$ Generation Partnership Project; Technical Specification Group Radio Access Network; Physical layer procedures (FDD) (Release 5), 3GPP TS 25.214 V5.11.0 (Jun. 2005).
$3^{rd}$ Generation Partnership Project; Technical Specification Group Radio Access Network; Physical layer procedures (FDD) (Release 6), 3GPP TS 25.214 V6.11.0 (Dec. 2006).
3rd Generation Partnership Project; Technical Specification Group Radio Access Network; High Speed Downlink Packet Access (HSDPA); Overall description; Stage 2 (Release 7), 3GPP TS 25.308 V7.3.0 (Jun. 2007).
3rd Generation Partnership Project; Technical Specification Group Radio Access Network; High Speed Downlink Packet Access (HSDPA); Overall description; Stage 2 (Release 7), 3GPP TS 25.308 V7.0.0 (Mar. 2006).
3rd Generation Partnership Project; Technical Specification Group Radio Access Network; Radio Resource Control (RRC); Protocol Specification (Release 7), 3GPP TS 25.331 V7.6.0 (Sep. 2007).
3rd Generation Partnership Project; Technical Specification Group Radio Access Network; Multiplexing and channel coding (FDD) (Release 7), 3GPP TS 25.212 V7.2.0 (Sep. 2006).
3rd Generation Partnership Project; Technical Specification Group Radio Access Network; Physical layer procedures (FDD) (Release 7), 3GPP TS 25.214 V7.2.0 (Sep. 2006).
3rd Generation Partnership Project; Technical Specification Group Radio Access Network; Multiplexing and channel coding (FDD) (Release 6), 3GPP TS 25.212 V6.9.0 (Sep. 2006).
3rd Generation Partnership Project; Technical Specification Group Radio Access Network; Multiplexing and channel coding (FDD) (Release 7), 3GPP TS 25.212 V7.6.0 (Sep. 2007).
3rd Generation Partnership Project; Technical Specification Group Radio Access Network; Radio Resource Control (RRC); Protocol Specification (Release 4), 3GPP TS 25.331 V4.17.0 (Mar. 2005).
3rd Generation Partnership Project; Technical Specification Group Radio Access Network; Physical layer procedures (FDD) (Release 7), 3GPP TS 25.214 V7.6.0 (Sep. 2007).
3rd Generation Partnership Project; Technical Specification Group Radio Access Network; Radio Resource Control (RRC); Protocol Specification (Release 6), 3GPP TS 25.331 V6.15.0 (Sep. 2007).
3rd Generation Partnership Project; Technical Specification Group Radio Access Network; Physical layer procedures (FDD) (Release 6), 3GPP TS 25.214 V6.10.0 (Sep. 2006).
3rd Generation Partnership Project; Technical Specification Group Radio Access Network; Radio Resource Control (RRC); Protocol Specification (Release 6), 3GPP TS 25.331 V6.11.0 (Sep. 2006).
3rd Generation Partnership Project; Technical Specification Group Radio Access Network; Radio Resource Control (RRC); Protocol Specification (Release 5), 3GPP TS 25.331 V5.20.0 (Sep. 2007).
3rd Generation Partnership Project; Technical Specification Group Radio Access Network; Medium Access Control (MAC) protocol specification (Release 1999), 3GPP TS 25.321 V3.17.0 (Jun. 2004).
3rd Generation Partnership Project; Technical Specification Group Radio Access Network; Medium Access Control (MAC) protocol specification (Release 4), 3GPP TS 25.321 V4.10.0 (Jun. 2004).
3rd Generation Partnership Project; Technical Specification Group Radio Access Network; Medium Access Control (MAC) protocol specification (Release 5), 3GPP TS 25.321 V5.12.0 (Sep. 2005).
3rd Generation Partnership Project; Technical Specification Group Radio Access Network; Medium Access Control (MAC) protocol specification (Release 5), 3GPP TS 25.321 V5.13.0 (Mar. 2007).
3rd Generation Partnership Project; Technical Specification Group Radio Access Network; Physical channels and mapping of transport channels onto physical channels (FDD) (Release 1999), 3GPP TS 25.211 V3.12.0 (Sep. 2002).
3rd Generation Partnership Project; Technical Specification Group Radio Access Network; Physical channels and mapping of transport channels onto physical channels (FDD) (Release 4), 3GPP TS 25.211 V4.6.0 (Sep. 2002).

(56) References Cited

OTHER PUBLICATIONS

3rd Generation Partnership Project; Technical Specification Group Radio Access Network; Physical channels and mapping of transport channels onto physical channels (FDD) (Release 5), 3GPP TS 25.211 V5.8.0 (Dec. 2005).
3rd Generation Partnership Project; Technical Specification Group Radio Access Network; Physical channels and mapping of transport channels onto physical channels (FDD) (Release 6), 3GPP TS 25.211 V6.8.0 (Sep. 2007).
3rd Generation Partnership Project; Technical Specification Group Radio Access Network; Physical channels and mapping of transport channels (FDD) (Release 7), 3GPP TS 25.211 V7.3.0 (Sep. 2007).
3rd Generation Partnership Project; Technical Specification Group Radio Access Network; Spreading and modulation (FDD) (Release 1999), 3GPP TS 25.213 V3.9.0 (Dec. 2003).
3rd Generation Partnership Project; Technical Specification Group Radio Access Network; Spreading and modulation (FDD) (Release 4), 3G TS 25.213 V4.4.0 (Dec. 2003).
3rd Generation Partnership Project; Technical Specification Group Radio Access Network; Spreading and modulation (FDD) (Release 5), 3GPP TS 25.213 V5.6.0 (Jun. 2005).
3rd Generation Partnership Project; Technical Specification Group Radio Access Network; Spreading and modulation (FDD) (Release 6), 3GPP TS 25.213 V6.5.0 (Mar. 2006).
3rd Generation Partnership Project; Technical Specification Group Radio Access Network; Spreading and modulation (FDD) (Release 7), 3GPP TS 25.213 V7.3.0 (Sep. 2007).
3rd Generation Partnership Project; Technical Specification Group Radio Access Network; Enhanced uplink; Overall description; Stage 2 (Release 7), 3GPP TS 25.319 V7.2.0 (Mar. 2003).
3rd Generation Partnership Project; Technical Specification Group Radio Access Network; Medium Access Control (MAC) protocol specification (Release 6), 3GPP TS 25.321 V6.10.0 (Sep. 2006).
3rd Generation Partnership Project; Technical Specification Group Radio Access Network; Medium Access Control (MAC) protocol specification (Release 6), 3GPP TS 25.321 V6.13.0 (Jun. 2007).
3rd Generation Partnership Project; Technical Specification Group Radio Access Network; Enhanced uplink; Overall description; Stage 2 (Release 7), 3GPP TS 25.319 V7.1.0 (Sep. 2006).
3rd Generation Partnership Project; Technical Specification Group Radio Access Network; Requirements for support of radio management (FDD) (Release 6), 3GPP TS 25.133 V6.19.0 (Sep. 2007).
3rd Generation Partnership Project; Technical Specification Group Radio Access Network; Requirements for support of radio resource management (FDD) (Release 8), 3GPP TS 25.133 V8.0.0 (Sep. 2007).
3rd Generation Partnership Project; Technical Specification Group Radio Access Network; Physical channels and mapping of transport channels onto physical channels (FDD) (Release 6), 3GPP TS 25.211 V6.7.0 (Dec. 2005).
3rd Generation Partnership Project; Technical Specification Group Radio Access Network; Spreading and modulation (FDD) (Release 7), 3GPP TS 25.213 V7.0.0 (Mar. 2006).
3rd Generation Partnership Project; Technical Specification Group Radio Access Network; Requirements for support of radio resource management (FDD) (Release 6), 3GPP TS 25.133 V6.15.0 (Oct. 2006).
3rd Generation Partnership Project; Technical Specification Group Radio Access Network; Physical channels and mapping of transport channels onto physical channels (FDD) (Release 7), 3GPP TS 25.211 V7.0.0 (Mar. 2006).
3rd Generation Partnership Project; Technical Specification Group Radio Access Network; Requirements for support of radio resource management (FDD) (Release 7), 3GPP TS 25.133 V7.5.0 (Oct. 2006).
3rd Generation Partnership Project; Technical Specification Group Radio Access Network; Medium Access Control (MAC) protocol specification (Release 7), 3GPP TS 25.321 V7.5.0 (Jun. 2007).
3rd Generation Partnership Project; Technical Specification Group Radio Access Network; Requirements for support of radio resource management (FDD) (Release 4), 3GPP TS 25.133 V4.17.0 (Mar. 2006).
3rd Generation Partnership Project; Technical Specification Group Radio Access Network; Requirements for support of radio resource management (FDD) (Release 5), 3GPP TS 25.133 V5.18.0 (Sep. 2007).
3rd Generation Partnership Project; Technical Specification Group Radio Access Network; Requirements for support of radio resource management (FDD) (Release 1999), 3GPP TS 25.133 V3.22.0 (Sep. 2005).
3rd Generation Partnership Project; Technical Specification Group Radio Access Network; Requirements for support of radio management (FDD) (Release 7), 3GPP TS 25.133 V7.9.0 (Sep. 2007).
3rd Generation Partnership Project; Technical Specification Group Radio Access Network; Requirements for support of radio resource management (FDD) (Release 5), 3GPP TS 25.133 V5.17.0 (Dec. 2005).
3rd Generation Partnership Project; Technical Specification Group Radio Access Network; HSDPA Enhancements; (Release 6), 3GPP TS 25.899 V0.2.0 (May 2003).
3rd Generation Partnership Project; Technical Specification Group Radio Access Network; HSDPA Enhancements; (Release 6), 3GPP TR 25.899 V0.2.1 (Oct. 2003).
3rd Generation Partnership Project; Technical Specification Group Radio Access Network; High Speed Download Packet Access (HSDPA) enhancements (Release 6), 3GPP TR 25.899 V6.0.0 (Jun. 2004).
3rd Generation Partnership Project; Technical Specification Group Radio Access Network; High Speed Download Packet Access (HSDPA) enhancements (Release 6), 3GPP TR 25.899 V6.1.0 (Sep. 2004).
3rd Generation Partnership Project;Technical Specification Group Radio Access Network; Radio Resource Control (RRC); Protocol Specification (Release 5), 3GPP TS 25.331 V5.18.0 (Sep. 2006).
Enhanced CELL_FACH state in FDD, RP-060606, (Sep. 2006).
Jeon et al., "Channel Adaptive CQI Reporting Schemes for HSDPA Systems," IEEE Communications Letters, IEEE USA, vol. 10, No. 6, Jun. 2006, pp. 459-461.
Panasonic, "CQI report timing for modified CQI procedure," 3GPP TSG-RAN WG1 Meeting #34, R1-031070 (Oct. 6-10, 2003).
Technical Specification Group Radio Access Network; 3rd Generation Partnership Project; Medium Access Control (MAC) protocol specification (Release 7), 3GPP TS 25.321 V7.2.0 (Sep. 2006).
Holma et al., "WCDMA for UMTS, The Radio Resource Control Protocol," John Wiley & Sons, pp. 135-151 (Jan. 2001).
Interdigital, "Scheduling and Multiplexing of CQI and ACK/NACK Feedback for Single Carrier FDMA in Evolved UTRA Uplink," TSG-RAN WG1 WG1 LTE Ad Hoc Meeting, R1-060155 (Jan. 23-25, 2006).
Nokia, "Analysis of HSDPA in CELL_FACH state," 3GPP TSG-RAN WG1 Meeting #46bis, R1-062884 (Oct. 9-13, 2006).
LG Electronics, "Enhancements of CELL_FACH State," 3GPP TSG-RAN WG2 #54, R2-062440, Tallinn, Estonia, Aug. 28-Sep. 1, 2006).

\* cited by examiner

METHOD AND APPARATUS FOR SENDING AND RECEIVING CHANNEL QUALITY INDICATORS (CQIS)

CROSS REFERENCE TO RELATED APPLICATION

This application is a continuation of U.S. patent application Ser. No. 13/037,161 filed Feb. 28, 2011 which is a continuation of U.S. patent application Ser. No. 11/877,553 filed Oct. 23, 2007, which issued as U.S. Pat. No. 7,898,948 on Mar. 1, 2011, which claims the benefit of U.S. provisional application No. 60/908,484 filed Mar. 28, 2007, 60/888,146 filed Feb. 5, 2007 and 60/862,522 filed Oct. 23, 2006, and, the contents of which are hereby incorporated by reference herein.

FIELD OF INVENTION

The present invention is related to wireless communications.

BACKGROUND

A wireless transmit/receive unit (WTRU) in a universal terrestrial radio access network (UTRAN) may be in either an idle state or a connected state. While the WTRU is in a connected state, based on WTRU mobility and activity, the UTRAN may direct the WTRU to transition between Cell_PCH, URA_PCH, Cell_FACH, and Cell_DCH states. User plane communication between the WTRU and the UTRAN is only possible while the WTRU has a radio resource control (RRC) connection to the UTRAN.

The Cell_DCH state is categorized by dedicated channels in both uplink and downlink. On the WTRU side, this corresponds to continuous transmission and reception and may be demanding on user power requirements.

As defined in Release 6 of the Third Generation Partnership Project (3GPP) specifications, the Cell_FACH state does not use dedicated channels and thus allows better power consumption at the expense of a lower uplink and downlink throughput. While in the Cell_FACH state, uplink communication is achieved through a random access channel (RACH) while downlink communication is through a shared transport channel, (e.g., a forward access channel (FACH)), mapped to a secondary common control physical channel (S-CCPCH). The Cell_FACH state is suited for signalling traffic, (e.g., transmission of cell update and UTRAN registration area (URA) update messages), and for applications requiring very low uplink throughput.

While in the Cell_FACH state, the WTRU may perform signal measurements and/or traffic volume measurements (TVM) as specified in the measurement control information. The signal measurement is used by the WTRU for cell reselection. The TVM is reported to the UTRAN within a measurement report based on criteria specified on the measurement control information. The measurement report is sent via the RACH.

The RACH is based on a slotted-Aloha mechanism with an acquisition indication. Before sending an RACH message, a WTRU attempts to acquire the channel by sending a short preamble (made up of a randomly selected signature sequence) in a randomly selected access slot. After transmitting the RACH preamble, the WTRU waits for an acquisition indication from the UTRAN. If no acquisition indication is received, the WTRU ramps up the transmit power for the RACH preamble and retransmits the RACH preamble, (i.e., sends a randomly selected signature sequence in a selected access slot). If an acquisition indication is received, the WTRU has effectively acquired a channel, and may transmit an RACH message. The initial transmit power for the RACH preamble is set based on an open loop power control technique, and the ramp-up mechanism is used to further fine-tune the WTRU transmit power.

It has been proposed to use high speed downlink packet access (HSDPA) in a Cell_FACH state. HSDPA is a feature that was introduced in Release 5 of the third generation partnership project (3GPP) specifications. HSDPA operates in a Cell_DCH state. HSDPA makes better use of the downlink shared capacity by using three key concepts: adaptive modulation and coding (AMC), retransmissions using a hybrid automatic repeat request (HARQ) scheme, and Node-B scheduling.

Every two (2) milliseconds, the Node-B schedules transmissions on the high speed downlink shared channel (HS-DSCH) based on information the Node-B collects from the WTRUs and the status of the downlink buffers. In addition, the Node-B tailors the transmission bit rates to the specific WTRUs by adapting the MCS, transport block size, etc. The Node-B may transmit at a higher data rate to those WTRUs which perceive favorable channel conditions, and a lower data rate to those WTRUs that perceive unfavorable channel conditions, (e.g., at the cell edge).

For the HSDPA operations, the Node-B needs channel quality indication (CQI) and positive-acknowledgement (ACK)/negative-acknowledgement (NACK) feedback from the WTRUs. The CQI is an index into a table which provides the maximum MCS that the WTRU may support. The CQI is sent periodically with periodicity determined by the UTRAN. The ACK/NACK feedback is for the HARQ process. The ACK/NACK information is only provided in response to a packet being received on the downlink.

In Release 6 of the 3GPP specifications, the CQI and ACK/NACK information are transmitted via a high speed dedicated physical control channel (HS-DPCCH). Each WTRU is assigned a separate HS-DPCCH and as a result a WTRU may easily provide the feedback information. Moreover, the HS-DPCCH is power controlled using an offset to the uplink dedicated physical control channel (DPCCH), for which close loop power control is performed. The information on the HS-DPCCH is heavily coded to aid in detection. As more and more WTRUs use HSDPA, the number of feedback control channels increases. Even if these are power controlled, the feedback information may cause an uplink noise rise, reducing the capacity available for other uplink transmissions.

If HSDPA is to be used in a Cell_FACH state, the main problem is a lack of dedicated uplink channel to transmit the CQI and ACK/NACK information. Without the CQI and ACK/NACK information, the advantages of HSDPA are significantly reduced. 3GPP Release 6 specifications do not provide support for optimal MCS selection and scheduling for the HS-DSCH in a Cell_FACH state.

Therefore, it would be desirable to provide a method and apparatus for providing CQI information via a shared channel in a Cell_FACH state.

SUMMARY

A method and apparatus for sending a CQI via a shared or common channel while a WTRU is in a Cell-FACH state without having a dedicated channel allocated for the WTRU are disclosed. A WTRU performs a measurement of at least one parameter and generates a CQI based on the measurement. The WTRU then transmits the CQI via an RACH. The CQI may be transmitted using an RACH preamble. A plurality of signature sequences may be divided into a plurality of groups. The WTRU may select one group based on the CQI and randomly select a signature sequence among signature sequences in the selected group for transmitting the RACH preamble. The CQI may be appended to the RACH preamble. The CQI may be transmitted via a control part or a data part of the RACH message. The RACH message may be an RRC measurement report including CQI transmission. The CQI reporting may be triggered by successful decoding of the HS-SCCH transmission.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

It should be noted that although the embodiments will be described with reference to 3GPP high speed downlink packet access (HSDPA), the present invention is applicable to any wireless communication system where channel quality feedback information is required to be transmitted via a shared/common channel.

Figure 1:
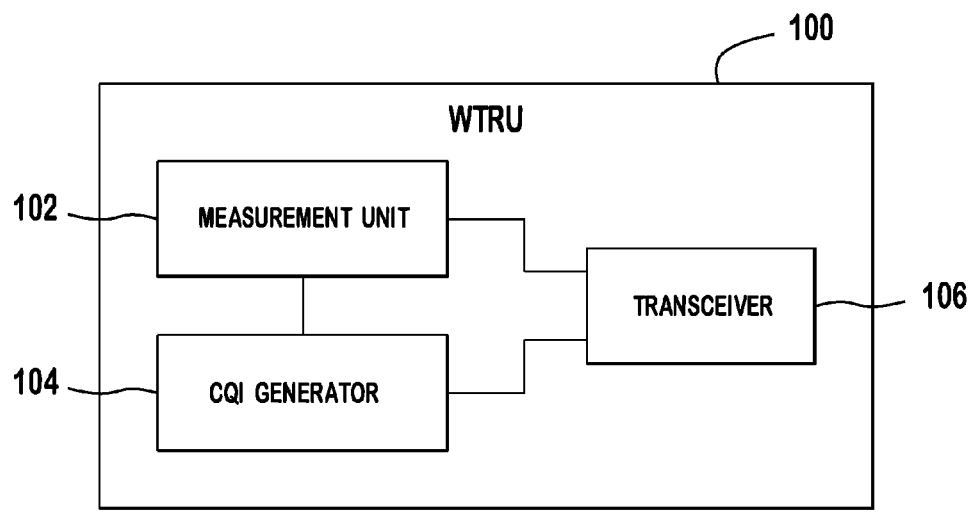
FIG. 1 is a block diagram of an example WTRU.

FIG. 1 is a block diagram of an example WTRU 100. The WTRU 100 may include a measurement unit 102, a CQI generator 104, and a transceiver 106. It should be noted that the WTRU 100 in FIG. 1 is provided as an example, not as a limitation, and the WTRU 100 may include any other conventional processing components necessary for wireless transmission and reception. The measurement unit 102 performs a measurement of at least one predetermined parameter to provide an estimate of the channel quality perceived by the WTRU 100.

The measurement parameter may be a downlink transport channel block error rate (BLER) while the WTRU 100 is in a Cell_FACH state. A high BLER may be interpreted that the downlink transmission rate is too high. The measurement parameter may be a path loss measured on a downlink reference channel, (e.g., a common pilot channel (CPICH)). A high path loss in the downlink may be interpreted as an indication that the downlink transmission rate is too high. The measurement parameter may be the number of preamble ramp-ups required before receiving an acquisition indication on an acquisition indication channel (AICH). For example, if the WTRU 100 requires many RACH preamble transmit power ramp-ups, or if the RACH transmission fails, the WTRU 100 may interpret that channel conditions are poor and ask for a reduction in the downlink transmission rate. The measurement parameter may be a received power on a CPICH, a high speed shared control channel (HS-SCCH), or any other downlink reference channel. By providing an indication of this power, the Node-B may estimate the path loss and increase or decrease the downlink transmission rate accordingly. The measurement parameter may be an estimate of a signal-to-noise ratio (SNR) measured on any downlink reference channel, (e.g., CPICH), where the noise comprises a thermal noise and an interference from neighbouring cells that cannot be cancelled by the WTRU. The measurement parameter may be CPICH Ec/NO, (i.e., CPICH received signal code power (RSCP)/received signal strength indicator (RSSI)) or primary common control physical channel (PC-CPCH) RSCP converted into HS-DPDCH measurement adding RSSI. Alternatively, HS-SCCH power may be measured.

The CQI generator 104 outputs a CQI based on the measurement(s), (i.e., the CQI is an encoded version of the measurement). One or a combination of any of the above WTRU measurements may be mapped into a CQI value, (e.g., an index to a look-up table), and sent to the Node-B via one of the feedback mechanisms that will be described in detail below. The CQI value may be sent to an RRC layer for reporting at the RRC layer. The CQI value may be filtered at the RRC layer. In performing the mapping, the WTRU 100 may also take into account its own receiver capabilities to generate a CQI.

The CQI is not necessarily a straight encoding of the measurements, but may also be an estimate of the transport block size or a maximum data rate that the WTRU 100 may support based on its receiver design and the measured quantities, (i.e., the CQI may be an encoded version of a transport block size or the maximum data rate that the WTRU may support to maintain a target block error rate (BLER). The maximum transport block size or the maximum data rate that may be supported by the WTRU is formatted and encoded into an index value, (i.e., CQI value).

Alternatively, the CQI may be a relative up or down command generated based on the measurement. For example, the relative up/down command may be generated based on a transport block size that the WTRU may support to maintain a target BLER. For instance, the WTRU 100 may decide that the channel quality is very poor and ask for a reduction in downlink transmission rate to the next lower level. In this case, the granularity of the control may be more than one step, (e.g., up 3 levels, down 4 levels). The relative up or down command may indicate an increase or decrease in maximum transport block size that the WTRU 100 may receive with an adequate BLER, or an increase or decrease a measurement value, (e.g., in dB), on a channel, (e.g., path loss).

Figure 5:
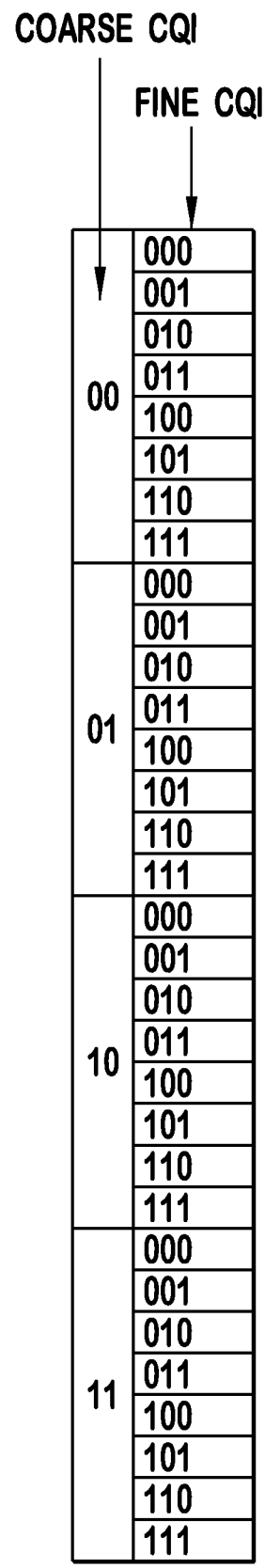
FIG. 5 shows an example two-tiered CQI structure.

The CQI may have a multi-tiered structure. FIG. 5 shows an example two-tiered CQI structure. It should be noted that FIG. 5 is provided as an example, not as a limitation, and any other CQI structure may be implemented. In this example, the CQI value is encoded with five (5) bits. The first two most significant bits (MSBs) are used as a coarse CQI and the three least significant bits (LSBs) are used as a fine CQI within each coarse CQI range. The CQI reporting via the RRC measurement reporting may be used for sending the coarse CQI (slow update), and physical layer (L1) procedure may be used for sending the fine CQI (fast update). In a slowly varying channel condition, the coarse CQI may be used, while if the rate of change of the CQI is faster, the CQI may be reported via L1-based CQI reporting procedure.

Once the CQI is generated, the transceiver 106 transmits the CQI to the Node-B. Since there is no dedicated control channel assigned to the WTRU 100 in a Cell_FACH state, the transceiver 106 sends the CQI information via an RACH or any other contention-based channel that requires the WTRU to first acquire the channel before initiating transmission.

The transmission of the CQI provides fresh and appropriate link performance predictors for transmissions on the HS-DPDCH. The CQI may be sent when the WTRU has previously been in a URA_PCH or Cell_PCH mode and performed no measurements and therefore no measurement is available to the UTRAN. The CQI may be reported when the WTRU has sent at least one measurement value to the UTRAN but is yet to receive any downlink transmission. The CQI may be reported when the WTRU has been receiving transmissions for some time, but the measurements become stale. In the last two cases, the amount of measurement controls required on the HS-DSCH is reduced.

Embodiments for sending the CQI are disclosed hereinafter. In accordance with a first embodiment, the WTRU 100 sends the CQI information using an RACH preamble. Conventionally, a WTRU selects a RACH preamble signature sequence randomly among a plurality of signature sequences. In accordance with the first embodiment, the signature sequences are divided into a plurality of groups. The WTRU 100 select one group based on the CQI and then selects a signature sequence randomly among the signature sequences in the selected group. The selection of the signature sequence is not completely random, but depends on the CQI. For example, if a two (2)-bit CQI is used and total 16 signature sequences are divided into four groups, each with four unique signature sequences, the CQI may be used to select one of the four (4) groups, and one of the four signature sequences in the selected group is randomly selected. Upon decoding the signature sequence at the Node-B, the Node-B cross-references the signature sequence number to determine the group and the transmitted CQI.

If the number of CQI indices exceeds 16, the number of conventional 16-bit preamble signature sequences may be increased from 16 to $2^k$ (where k>4), and rather than repeating the selected signature sequence 256 times in every preamble, the WTRU 100 may repeat the new signature sequence (256/($2^{k-4}$)) times.

Figure 2:
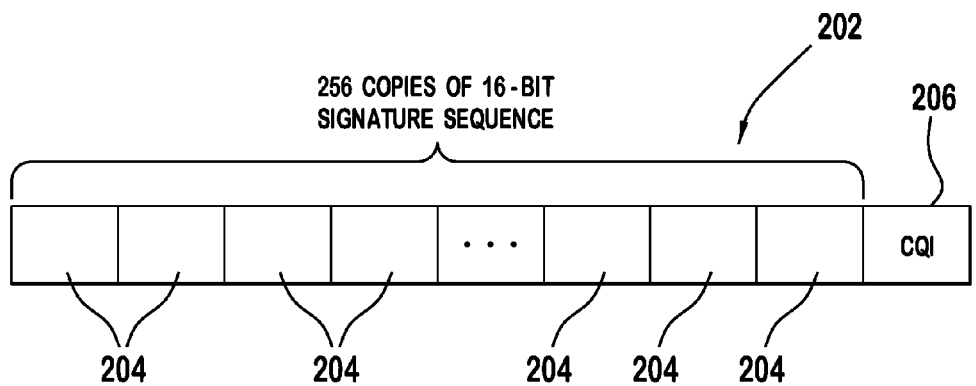
FIG. 2 shows a CQI appended at the end of an RACH preamble.

Alternatively, a CQI may be appended at the end of the RACH preamble. FIG. 2 shows a CQI 206 appended at the end of an RACH preamble 202. In this example, the RACH preamble transmission includes 256 repetitions of 16 bit signature sequence 204 and a CQI 206. When the Node-B detects the preamble sequence 202, the Node-B retrieves the CQI 206 at the end of the preamble sequence 202 and sends an acquisition indication. The WTRU identity (ID) may be determined when the Node-B decodes the RACH message. Alternatively, the WTRU ID may also be appended at the end the preamble. This allows transmitting all required information in the preamble without needing a subsequent RACH message transmission.

Figure 3:
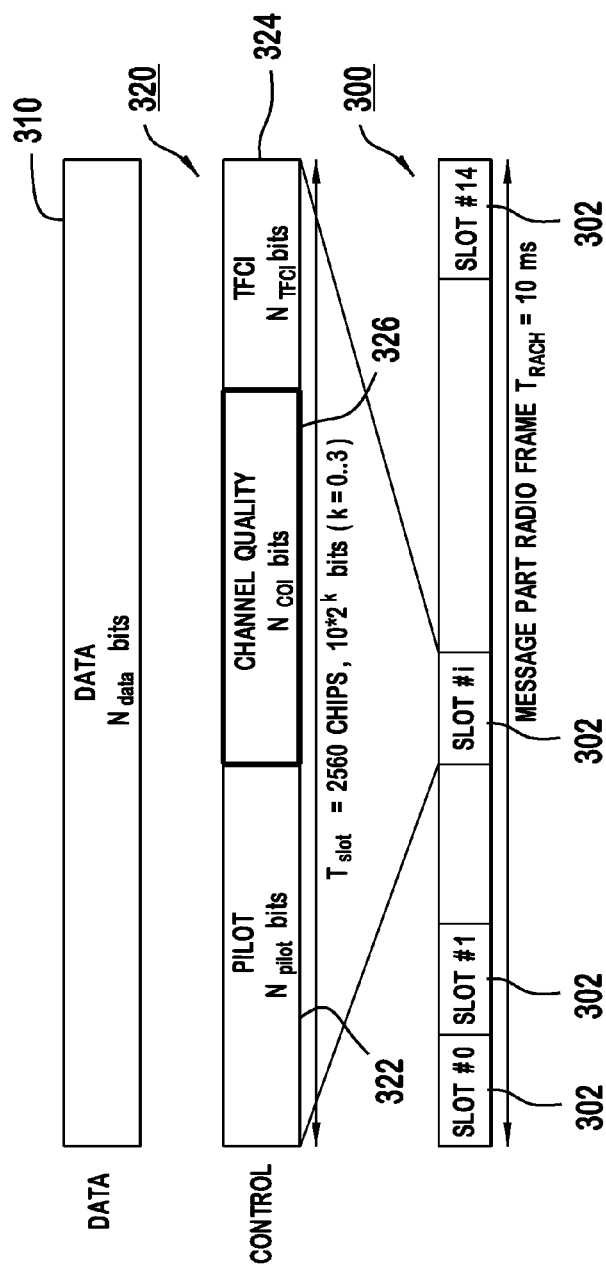
FIG. 3 shows an example of the CQI carried in the RACH control message.

In accordance with a second embodiment, a CQI is sent through the control part of the RACH message. FIG. 3 shows an example RACH time slot format. A 10 ms RACH radio frame 300 includes 15 time slots 302. Each time slot 302 includes a data part 310 and a control part 320 that are transmitted in parallel. Conventionally, the control part 320 carries pilot bits 322 and TFCI bits 324. In accordance with the second embodiment, the CQI 326 is included in the control part 320.

Figure 4:
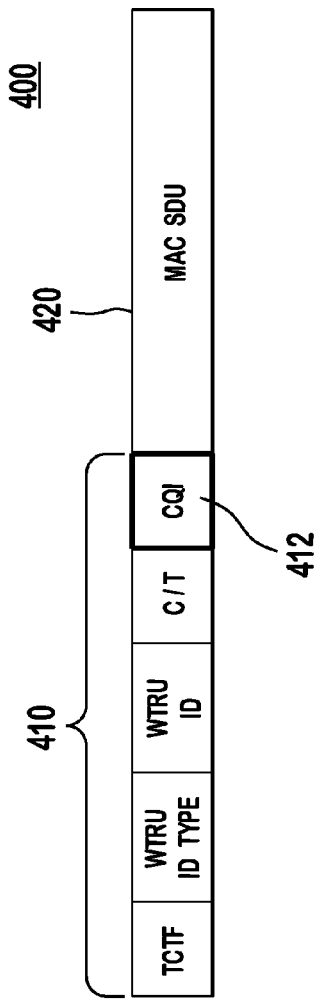
FIG. 4 shows an example of the CQI carried in the RACH header in an RACH message.

In accordance with a third embodiment, the CQI is sent through the data part 310 of the RACH message. FIG. 4 shows an example RACH header 410 and an MAC service data unit (SDU) 420 in an RACH message 400. The CQI 412 is included in the RACH header 410. In order to include the CQI 412 in the RACH header 410, the physical layer provides the CQI 412 to the MAC layer (MAC-c/sh layer), and the MAC layer adds the CQI 412 in the MAC header 410. The signalling between the physical layer and the MAC layer may be implemented, for example, through a modified PHY-Status-IND primitive.

In accordance with a fourth embodiment, the CQI may be sent through an RRC message, (e.g., measurement report message). The CQI is sent to the RRC layer of the WTRU to be included in the RRC message. The CQI may optionally be filtered by the RRC layer before sending the RRC message.

As the capacity of the physical RACH (PRACH) is limited, rules are defined for determining when transmission of the CQI should take place. A WTRU may transmit the CQI when the WTRU has an MAC SDU to transmit via the RACH, (i.e., opportunistic transmission). The CQI may be transmitted within the RACH preamble or RACH message as disclosed above.

Opportunistic transmission may not be sufficient because it depends on the need to transmit information on the uplink which is not necessarily correlated to downlink transmissions. To enable CQI reporting in the absence of uplink transmission on the RACH, the WTRU may transmit the CQI, even if the WTRU does not need to send an MAC SDU, (i.e., CQI stand-alone transmission). The TFCI field may be used to signal the Node-B that the RACH transmission is a CQI stand-alone transmission. For the CQI stand-alone transmissions, a CQI may be appended to the RACH preamble as shown in FIG. 2, or may be transmitted in the control part or in the data part of the RACH message.

Alternatively, triggering criteria may be defined for transmission of the CQI, (i.e., stand-alone CQI transmissions). A CQI may be transmitted periodically. The WTRU may send the CQI periodically once the WTRU has an active HSDPA connection in a Cell_FACH state. The WTRU may continuously monitor the channel condition, and send the CQI at periodic intervals. The rate of CQI reporting is provided to the WTRU as a configuration parameter. The CQI may be reported with a random offset to reduce probability of collision between WTRUs.

A CQI may be polled by the Node-B. For example, the WTRU may transmit a CQI upon reception of data on the downlink. The Node-B may select a low MCS or transmit no data at all on this initial downlink transmission (thus reducing interference) if the Node-B does not have fresh CQI information. The downlink transmission may be a transmission on an HS-SCCH destined to the WTRU. In this case, the WTRU monitors the HS-SCCH, and triggers the transmission of the CQI when the WTRU successfully decodes its address, (i.e., HSDPA radio network temporary identity (H-RNTI)), on the HS-SCCH transmission in the downlink.

The WTRU may send a CQI upon significant change of channel conditions. The WTRU may transmit a CQI when the difference between the current CQI (or average CQI) and the last reported CQI exceeds a pre-determined value. The WTRU, (e.g., RRC), is configured with a CQI delta. Every time the measured CQI value exceeds the previous CQI value by the CQI delta for a predefined period of time, a CQI reporting is triggered.

The WTRU may send a CQI at the start of an HSDPA connection in a Cell_FACH state. The WTRU may continuously monitor the channel condition, but the CQI may be sent after an RRC CONNECTION SETUP message is received for the HSPDA channel.

Figure 6:
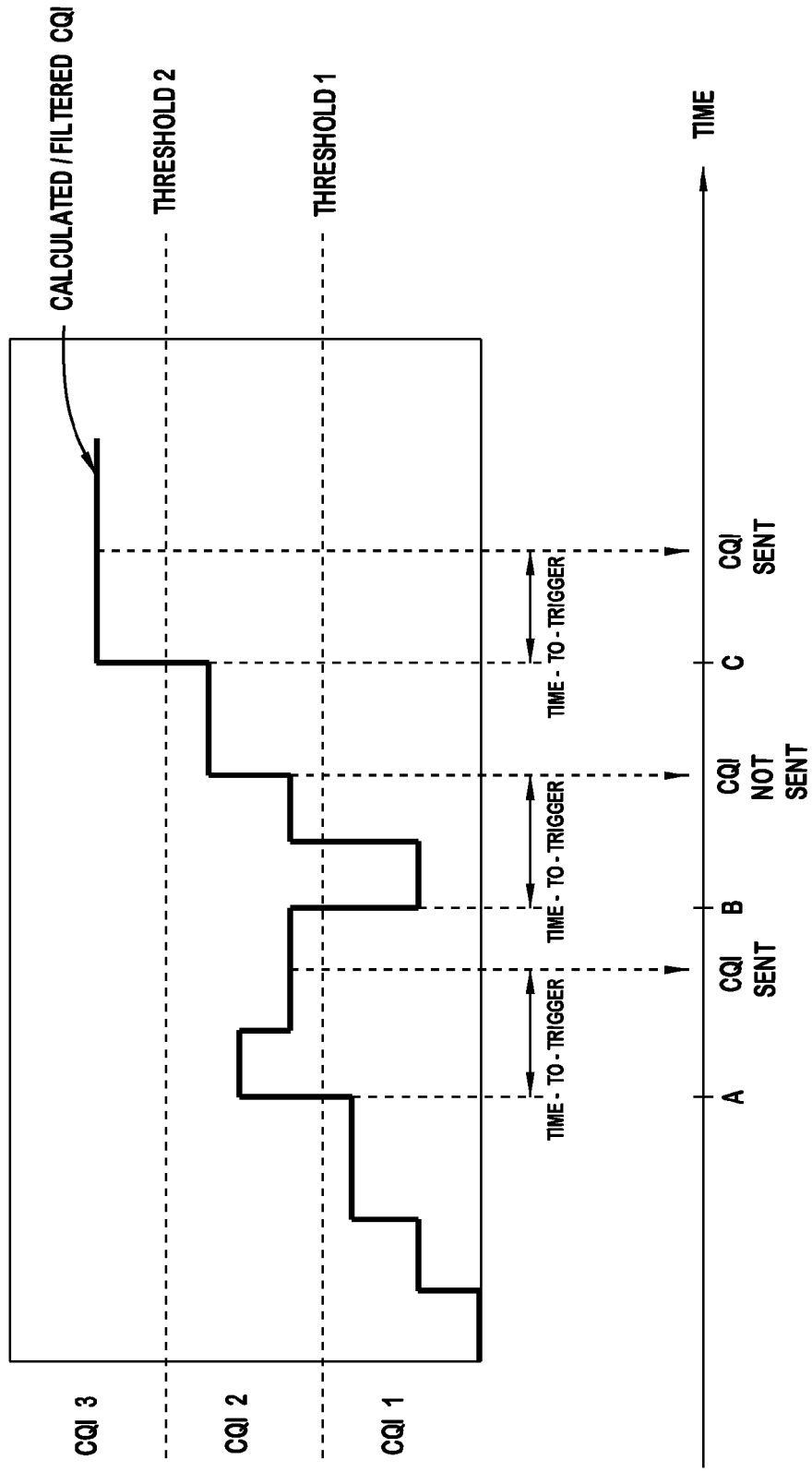
FIG. 6 shows a CQI reporting triggering example.

The range of the CQI may be divided into multiple CQI levels with CQI thresholds, and the WTRU may send a CQI based on comparison of the measured (or filtered) CQI to the CQI thresholds. If the measured (or filtered) CQI crosses a CQI threshold, (i.e., changes CQI level), and remains at the new CQI level for a predefined period of time, a CQI reporting is triggered. FIG. 6 illustrates a CQI triggering example based on comparison to the CQI thresholds. It should be noted that FIG. 6 is provided as an example, not as a limitation, and the CQI range may be divided into any number of levels. In this example, two CQI thresholds are configured and the CQI range is divided into three levels, (CQI1, CQI2, and CQI3). Initially, the measured CQI belongs to CQI1 level. At time A, the measured CQI changes to the second level, CQI2. At this time, a timer is set to trigger the CQI reporting. The measured CQI remains in the CQI2 level until the timer expires, and therefore a CQI reporting is triggered at the expiration of the timer. At time B, the measured CQI changes to CQI1 level, and the timer is set again. The measured CQI changes to CQI2 level before the timer expires. Therefore, a CQI is not sent at this time. At time C, the measured CQI changes to CQI3 level, and the timer is set. The measured CQI remains in the CQI3 level until the timer expires, and a CQI reporting is triggered at the expiration of the timer.

The CQI reporting may be triggered based on certain WTRU actions. For example, the CQI may be sent when the WTRU changes to the Cell_FACH state and/or upon cell reselection in either of the Cell_FACH, Cell_PCH, and URA_PCH states.

The CQI reporting may be triggered based upon downlink reception, (e.g., sent when the WTRU fails to decode the downlink reception), and the CQI may be sent together with RRC and/or radio link control (RLC) ACK/NACK information. The CQI reporting triggering rate may be adjusted based on NACK counts. The reporting rate is increased as the NACK counts increase and the reporting rate is decreased as the ACK counts increases.

The CQI reporting may be triggered based on HARQ BLER, when no data or control information, (i.e., HS-SCCH transmissions), is received when such is expected, based on transport block BLER.

The CQI reporting may be triggered based on HS-SCCH reception. Once the WTRU successfully decodes an HS-SCCH transmission, the WTRU expects data transmission on the associated HS-PDSCH. After correctly decoding a HS-SCCH transmission, if the WTRU is no table to recover the HS-PDSCH transmission, the CQI reporting may be triggered. This triggering mechanism may be based on an averaging window, such that the CQI reporting is triggered upon M occurrences out of N observances. The M and N may be hardcoded or network configurable.

Alternatively, the CQI reporting may be triggered by counting the number of successful HS-SCCH transmissions (K) in an observation window. The observation window is started with the first decoding of the HS-SCCH transmission with a new data indicator indicating a new transport block. The observation window should be large enough to include all retransmissions that are expected for each transmitted packet. The observation window may be terminated at the arrival of the next HS-SCCH transmission with a new data indicator. The CQI is triggered when K is less than the maximum number of retransmissions configured for HSDPA in Cell_FACH. The value of K and the observation window size may be network configurable. The trigger may be based on an averaging window.

Alternatively, the CQI reporting may be triggered after correctly decoding the HS-SCCH transmission and recovering the transmitted packet on the HS-PDSCH after L retransmissions, where L is less than the maximum number of retransmissions configured for HSDPA in Cell_FACH. The parameter L may be hardcoded or network configurable. This event implies that current MCS is too conservative. The trigger may be based on an averaging window.

The CQI reporting may be triggered based on inactivity on the HS-SCCH. The WTRU may start a timer after decoding a HS-SCCH transmission and trigger the CQI reporting if the WTRU fails to receive any HSDPA transmission until the timer expires. The timer value may be hardcoded or network configurable.

The threshold values and timer values disclosed hereinbefore may be defined as part of the system information. The threshold and timer values may be redefined. In order to reduce the downlink signaling load to specify these new threshold and timer values via RRC signaling, the thresholds and timer values may be changed autonomously by the WTRU based on the RRC and/or RLC ACK/NACK information. The threshold values may be linear, asymmetric, or logarithmic (having finer granularity for certain levels at the expense of others). The threshold values may be changed autonomously by the WTRU based on the HARQ BLER.

The CQI reporting may be controlled by downlink control signalling in a Cell_FACH state. The downlink control signalling may be sent via an HS-SCCH, an MAC-hs header, a physical layer signal, an L2 control channel in the downlink, etc.

Transmission of the CQI via the RACH may be configured by the higher layer signaling, (e.g., layer 3 signaling). Such configuration includes the signature sequences that the WTRU should use to transmit the RACH preamble, the time slot format, scrambling and channelization codes that the WTRU should use to transmit the PRACH, and the like.

The network may learn about the capabilities of different WTRUs, and determine whether a WTRU is capable of sending a CQI through the PRACH/RACH. The network may send configuration parameters to the WTRU based on the WTRU capability. The configuration parameters may be sent by adding new information elements (IEs) to a conventional system information block (SIB) in a BCCH, defining a new SIB (and schedule) in the BCCH, or adding an IE to the RRC CONNECTION SETUP message when the HSDPA channel is set up. The new measurements may fall under the category of "Quality Measurements" and may be applied to WTRUs in Cell_FACH state. The configuration parameters includes a method for sending the CQI information, (over RACH, over a L1-based approach, using coarse or fine CQI, and the like), CQI reporting parameters, CQI filtering coefficients (for layer 3 filtering of CQI value), CQI reporting criteria, (i.e., timer and threshold values), and the like.

For backward compatibility, the Node-B may be made aware that a WTRU is sending a CQI through a RACH, (i.e., the RACH transmission includes a CQI). In order to distinguish the RACH transmissions including a CQI, new signature sequences may be defined, or certain signature sequences are reserved, for CQI reporting purposes so that the Node-B may distinguish an RACH transmission including a CQI and an RACH transmission not including a CQI. Alternatively, one or several values for the TFCI field of the control part of the RACH message, (or any field in the RACH header), may be reserved for RACH transmissions that include a CQI. As another alternative, a set of scrambling and channelization codes may be reserved for RACH transmissions that include a CQI.

The present invention is applicable to a WTRU in Cell_PCH and URA_PCH states. In these states, the measurements used for CQI calculation need not be updated continually, but may be monitored upon reception of a paging indicator channel (PICH) in anticipation of switching to the Cell_FACH state. This would allow the WTRU to stay in a power saving state, and only make measurements when needed.

Although the features and elements are described in the preferred embodiments in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a processor configured to send channel quality indicators (CQIs) at periodic intervals on an uplink channel;
the processor is further configured to decode a downlink control channel associated with a radio network temporary identifier (RNTI) of the WTRU;
the processor is further configured, in response to decoding of the downlink control channel associated with the RNTI of the WTRU, to determine that a wireless network requests the WTRU to send a CQI; and
the processor is further configured, in response to the determination that the wireless network requests the WTRU to send the CQI, to send the CQI to the wireless network.

2. The WTRU of claim 1 wherein the uplink channel is one of a shared channel, a common channel, or a random access channel (RACH).

3. The WTRU of claim 1 further comprising:
the processor is further configured to send acknowledgements and negative acknowledgements on the uplink channel to the wireless network.

4. The WTRU of claim 1 wherein the WTRU is further configured to send the CQI to the wireless network on the uplink channel.

5. The WTRU of claim 1 wherein the downlink control channel is a shared channel.

6. The WTRU of claim 1 wherein the downlink control channel is a high speed shared control channel (HS-SCCH).

7. The WTRU of claim 1 wherein the determination that the wireless network requests the WTRU to send the CQI is one of a trigger or a poll to send the CQI.

8. The WTRU of claim 1 wherein the RNTI is detected or received by the WTRU on the downlink control channel.

9. A method comprising:
sending, by a wireless transmit/receive unit (WTRU), channel quality indicators (CQIs) at periodic intervals on an uplink channel;
decoding, by the WTRU, a downlink control channel associated with a radio network temporary identifier (RNTI) of the WTRU;
determining, by the WTRU in response to decoding of the downlink control channel associated with the RNTI of the WTRU, that a wireless network is requesting the WTRU to send a CQI; and
wherein, in response to the determining that the wireless network is requesting the WTRU to send the CQI, the WTRU sends the CQI to the wireless network.

10. The method of claim 9 wherein the uplink channel is one of a shared channel, a common channel, or a random access channel (RACH).

11. The method of claim 9 further comprising:
sending, by the WTRU, acknowledgements and negative acknowledgements on the uplink channel to the wireless network.

12. The method of claim 9 wherein the WTRU is further configured to send the CQI to the wireless network on the uplink channel.

13. The method of claim 9 wherein the downlink control channel is a shared channel.

14. The method of claim 9 wherein the downlink control channel is a high speed shared control channel (HS-SCCH).

15. The method of claim 9 wherein the determination that the wireless network requests the WTRU to send the CQI is one of a trigger or a poll to send the CQI.

16. The method of claim 9 wherein the RNTI is detected or received by the WTRU on the downlink control channel.

17. A wireless network device comprising:
a processor configured to receive channel quality indicators (CQIs) at periodic intervals on an uplink channel from a wireless transmit/receive unit (WTRU);
the processor is further configured to send over a downlink channel a request for the WTRU to send a CQI;
wherein the request is sent in association with a radio network temporary identifier (RNTI) of the WTRU; and
the processor is further configured, in response to the request and the RNTI, to receive the CQI from the WTRU.

18. The wireless network device of claim 17 wherein the wireless network device is a Node B.

19. The wireless network device of claim 17 wherein the uplink channel is one of a shared channel, a common channel, or a random access channel (RACH).

20. The wireless network device of claim 17 further comprising:
the processor is further configured to receive acknowledgements and negative acknowledgements on the uplink channel from the WTRU.

21. The wireless network device of claim 17 wherein the wireless network device is further configured to receive the CQI on the uplink channel.

22. The wireless network device of claim 17 wherein the downlink control channel is a shared channel.

23. The wireless network device of claim 17 wherein the downlink control channel is a high speed shared control channel (HS-SCCH).

24. The wireless network device of claim 17 wherein the request is one of a trigger or a poll for the WTRU to send the CQI.

25. A method performed by a wireless network device, the method comprising:
receiving, by the wireless network device, channel quality indicators (CQIs) at periodic intervals on an uplink channel from a wireless transmit/receive unit (WTRU);
sending, by the wireless network device over a downlink control channel, a request for the WTRU to send a CQI; wherein the request is sent in association with a radio network temporary identifier (RNTI) of the WTRU; and
receiving, in response to the request and the RNTI, the CQI from the WTRU.

26. The method of claim 25 wherein the wireless network device is a Node B.

27. The method of claim 25 wherein the uplink channel is one of a shared channel, a common channel, or a random access channel (RACH).

28. The method of claim 25 further comprising:
receiving, by the wireless network device, acknowledgements and negative acknowledgements on the uplink channel from the WTRU.

29. The method of claim 25 wherein the CQI is received on the uplink channel.

30. The method of claim 25 wherein the downlink control channel is a shared channel.

31. The method of claim 25 wherein the downlink control channel is a high speed shared control channel (HS-SCCH).

32. The method of claim 25 wherein the request is one of a trigger or a poll for the WTRU to send the CQI.

* * * * *

UNITED STATES PATENT AND TRADEMARK OFFICE
CERTIFICATE OF CORRECTION

PATENT NO. : 8,649,263 B2  
APPLICATION NO. : 13/452301  
DATED : February 11, 2014  
INVENTOR(S) : DiGirolamo et al.

Page 1 of 1

It is certified that error appears in the above-identified patent and that said Letters Patent is hereby corrected as shown below:

ON THE TITLE PAGE

At item (54), line 3 of the section, and in the Specification, at column 1, line 3, after the word "INDICATORS", delete "(CQIS)" and insert therefor --(CQIs)--.

At page 1, item (56) OTHER PUBLICATIONS, line 3 of this section, at the beginning of the line, delete "(HSPDA);" and insert therefor --(HSDPA);--.

At page 2, item (56) OTHER PUBLICATIONS, column 1, line 2 of this section, after the word "Packet", delete "(HSPDA);" and insert therefor --(HSDPA);--.

At page 3, item (56) OTHER PUBLICATIONS, column 2, line 29 of this section, at the beginning of the line, delete "TS" and insert therefor --TR--.

IN THE SPECIFICATION

At column 5, line 55, after the word "end", insert --of--.

At column 7, line 3, after the word "the", delete "HSPDA" and insert therefor --HSDPA--.

At column 7, line 42, after the word "counts", delete "increases" and insert therefor --increase--.

At column 7, line 51, after the word "is", delete "no table" and insert therefor --not able--.

At column 8, line 51, after the word "parameters", delete "includes" and insert therefor --include--.

At column 8, line 53, at the beginning of the line, delete "a" and insert therefor --an--.

Signed and Sealed this  
Twenty-fourth Day of June, 2014

Michelle K. Lee  
*Deputy Director of the United States Patent and Trademark Office*